Figure 1:
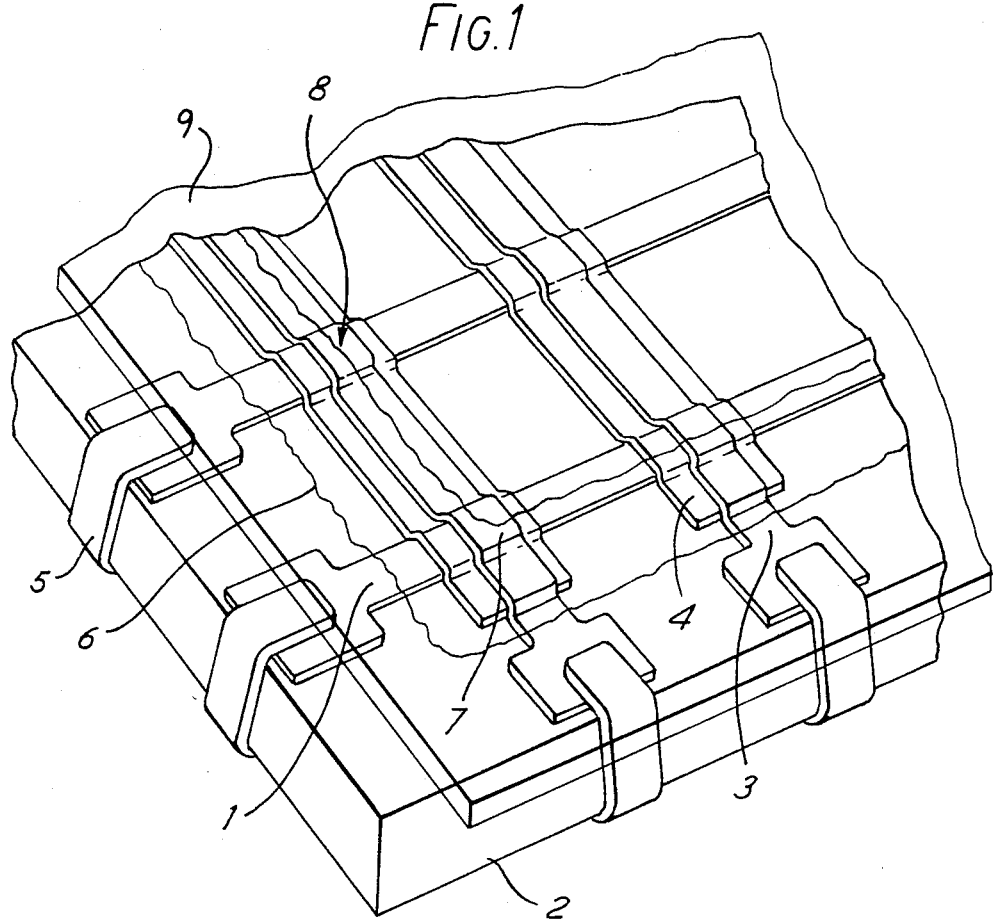

United States Patent [19]

Severwright

[11] Patent Number: 4,549,093
[45] Date of Patent: Oct. 22, 1985

[54] TACTILE ARRAY SENSOR

[75] Inventor: Jeremy S. Severwright, Slough, England

[73] Assignee: EMI Limited, Hayes, England

[21] Appl. No.: 536,530

[22] Filed: Sep. 28, 1983

[30] Foreign Application Priority Data

Sep. 29, 1982 [GB] United Kingdom ............... 8227733

[51] Int. Cl.⁴ ...................... H01H 13/00; H01B 11/02
[52] U.S. Cl. .................................. 307/147; 307/116; 200/5 A; 200/86 R; 174/68.5
[58] Field of Search ..................... 307/116, 119, 147; 340/347 R, 347 P, 712; 174/68.5; 361/410, 416; 200/5 A, 86 R

[56] References Cited

U.S. PATENT DOCUMENTS

| | | | |
|---|---|---|---|
| 3,806,629 | 4/1974 | Cocca | 174/68.5 |
| 3,821,611 | 6/1974 | Bacher | 361/410 |
| 4,071,691 | 1/1978 | Pepper, Jr. | 178/19 |
| 4,085,302 | 4/1978 | Zerk et al. | 200/5 A |
| 4,319,078 | 3/1982 | Yokoo et al. | 178/18 |

FOREIGN PATENT DOCUMENTS

| | | |
|---|---|---|
| 1310683 | 3/1973 | United Kingdom . |
| 1486988 | 9/1977 | United Kingdom . |
| 1501618 | 2/1978 | United Kingdom . |
| 1584479 | 2/1981 | United Kingdom . |

*Primary Examiner*—Harry E. Moose, Jr.
*Assistant Examiner*—Derek S. Jennings
*Attorney, Agent, or Firm*—Fleit, Jacobson, Cohn & Price

[57] ABSTRACT

A tactile array sensor comprises an array of substantially parallel row conductors disposed upon an alumina substrate. An array of substantially parallel column conductors overlies the array of row conductors and a layer of insulative material is disposed between the row conductors and the column conductors. A conductive rubber sheet overlies the column conductors. A multiplexing circuit addresses the row and column conductors and, when an object is in contact with an area of the conductive sheet, the circuit generates output signals indicative of all crossing points within the area, due to electrical contact being made between the row and column conductors via the conductive sheet.

10 Claims, 2 Drawing Figures

TACTILE ARRAY SENSOR

This invention relates to tactile array sensors.

Such sensors have hitherto been proposed for digitising sequential positions of a probe or stylus, such as in signature recognition. Coincidence techniques for tactile sensing, wherein two arrays of substantially parallel conductors, one overlying the other in a row and column formation, are also known. Pressure applied to a particular point where a row conductor crosses a column conductor may be detected by subsequent contact of the two conductors at that point to form an electrical path.

However, these sensors are primarily designed to detect only a single pressure point or several pressure points sequentially, and not to detect substantial surface area upon which pressure may be exerted by, for example, an object pressed thereupon.

It is therefore an object of the present invention to provide an improved tactile array sensor to those which have been provided heretofore.

According to one aspect of the invention there is provided a tactile array sensor comprising a substrate having disposed thereupon a first array of conductors underlying in crossing relationship a second array of conductors, an insulative material disposed between the first array and the second array at least at crossing points where a conductor of the second array overlies a conductor of the first array, said second array being overlaid with a conductive layer, said sensor being constructed so as to space said first array of electrical conductors from said second array of electrical conductors, whilst no pressure is applied thereto.

According to another aspect of the invention there is provided a method of constructing the tactile array sensor, as set forth in the immediately preceding paragraph, wherein separate layers forming the first array, the insulative material and the second array are sequentially screen-printed onto the substrate and the substrate is baked so that the layers are fused therewith, the conductive sheet then being positioned thereabove.

There is preferably included a circuit arrangement for detecting substantially all crossing points within an area of the surface of the conductive sheet to which pressure is applied and for generating electrical signals indicative of the locations of said crossing points to which pressure is applied relative to the first and second arrays.

Preferably, the conductors of the first array and the conductors of the second array are respectively substantially parallel.

It is also preferable that the conductors of each array are orthogonal with respect to each other, so as to produce a substantially square matrix formation of row conductors and column conductors.

The conductive sheet is preferably made of conductive rubber to provide a relatively high resistance between the sheet and the underlying conductors.

An insulative layer of rubber or a plastics material may also be provided overlying the conductive sheet to prevent possible malfunction of the sensor when pressure is applied on an area thereof by a metallic object.

Electronic components associated with the sensor are preferably assembled on the opposite side of the substrate to that bearing the arrays of conductors and insulative material.

The substrate is preferably fabricated from an alumina sheet.

It may therefore be envisaged that, when an object is pressed onto the surface of the sensor, electrical contact can be made between the conductive rubber sheet and a number of row conductors and column conductors, the number being dependent on the extent of the area of the surface to which pressure is applied. The corresponding crossing points of these row conductors and column conductors can be simultaneously detected by the circuit arrangement, which can thus generate an electrical signal indicative of the area of the surface which is in contact with the object. Further analysis may then derive the position and orientation of the object on that surface of the sensor.

A tactile array sensor in accordance with the present invention may be employed in the field of robotics, wherein one or more sensors may be mounted on the inner surface of a robot gripper having jaws with which the robot can pick up and hold an object. As the jaws close around the object, the sensors can provide information from which a subsequent analysis process can derive the position and orientation of the object in the robot gripper.

A practical requirement for sensors of this kind may arise in a situation where robots are employed for assembly work of components, for example. The components are commonly supplied individually packed in cups of plastics pallets and, although the robot gripper can descend into a suitably designed cup and grip the component therein reliably, its final position within the gripper will not be accurately known. If the component is then to be assembled onto other components with which it has limited clearance, any positional inaccuracy may lead to operational failure and damage of the assembled components.

However, utilisation of the tactile array sensor can provide determination of the position of the component within the gripper, thus allowing correction of any positional inaccuracy.

The sensor may also be used to detect slippage or movement of a component in the robot gripper.

In a preferred embodiment, tactile array sensor is a square of dimensions approximately 2.5 to 5 cms and it is provided with 32 conductors in each array. The conductors are therefore preferably at a pitch of approximately 1 mm.

Figure 2:
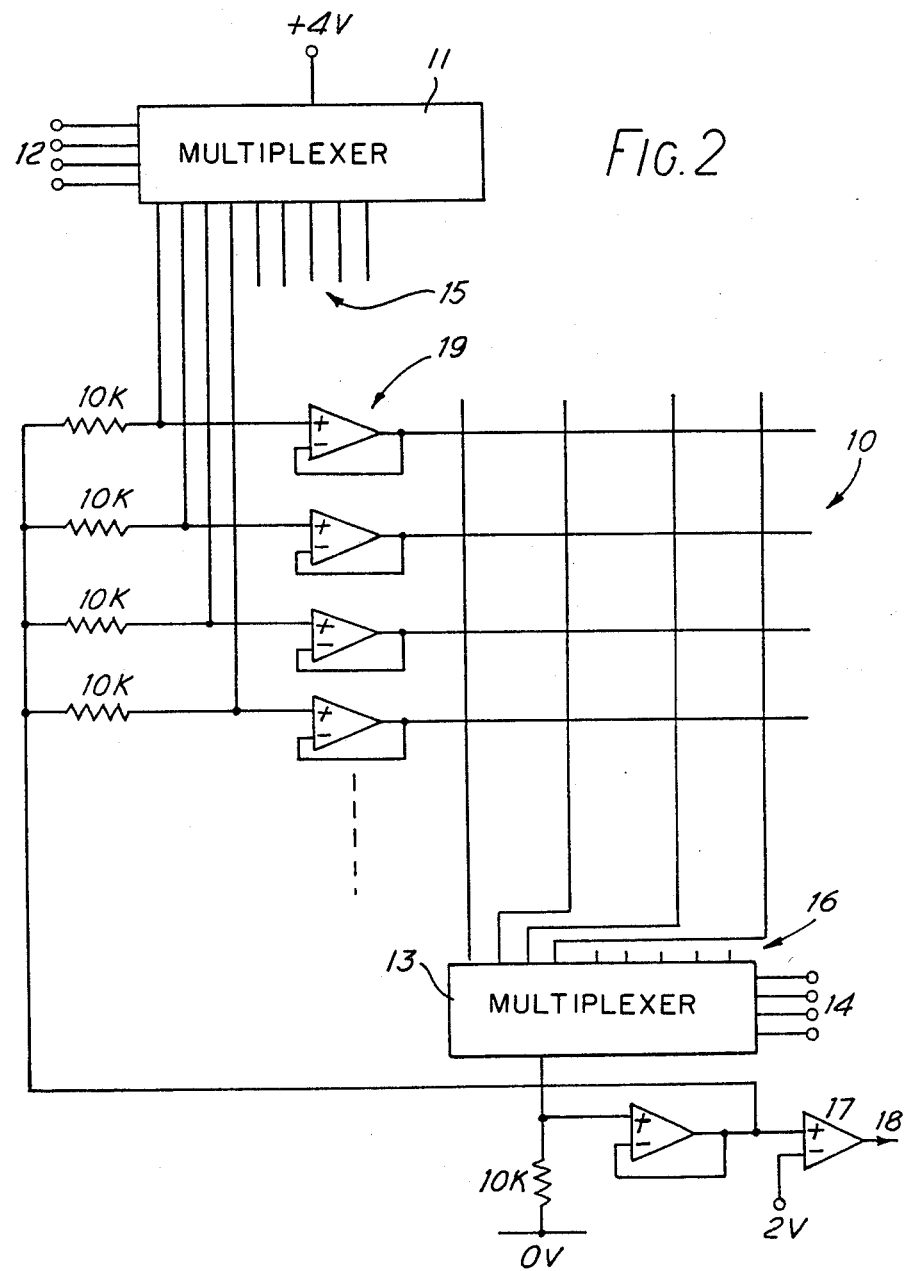

The present invention will now be further described by way of example only with reference to the accompanying drawings wherein:

FIG. 1 shows schematically part of a tactile array sensor in accordance with the invention, and FIG. 2 shows a preferred circuit arrangement incorporating the sensor in accordance with the invention.

Referring now to FIG. 1, in which part of a tactile array sensor is shown, an array of substantially parallel row conductors, one such row conductor being shown at 1, is disposed upon an alumina substrate 2. An array of substantially parallel column conductors, one such column conductor being shown at 3, overlies the array of row conductors, a layer of insulative material, shown at 4, being disposed between row conductor 1 and column conductor 3.

It can be seen that the insulative material 4, which is preferably glass, lies under and extends along the entire length of column conductor 3, as this allows for easier construction of the sensor.

A conductive rubber sheet, part of which is shown at 6, overlies the column conductors. Raised, bridge-like sections, one being shown at 7, of the column conductors where they cross over the row conductors, ensure that the conductive rubber sheet 6 does not touch the row conductors, when no pressure is applied thereto. This therefore means that mechanical spacers to prevent the conductive sheet 6 from touching the row conductors until pressure is applied are not required.

A further advantage of the present invention is that the conductive sheet 6 does not require any particular alignment over the substrate 2, nor is it necessary to bond connectors to the sheet 6, so that it need only be held in place mechanically.

It can also be seen from FIG. 1 that this matrix formation of row and column conductors provides a number of crossing points, one being indicated at 8, where a particular column conductor crosses over a particular row conductor, with insulative material disposed therebetween.

The row and column conductors are connected by metallic clips, one being shown at 5, to the electronic components of a circuit arrangement, which is assembled on the under surface of the alumina substrate 2. A preferred circuit arrangement is shown in FIG. 2 and comprises a conventional multiplexing circuit which addresses the row and column conductors.

Referring now to FIG. 2, an analogue 1 to 32 multiplexer 11 with row address 12 has connections 15 to the row conductors of the sensor, indicated at 10, each row having an operational amplifier 19. Another analogue 1 to 32 multiplexer 13 with column address 14 has connections 16 to the column conductors of the sensor.

Electrical signals generated by contact between the row and column conductors via the conductive sheet, when pressure is applied thereto, are passed through output 18, via a 2 V comparator 17.

When an object (not shown in the figures) is pressed onto the surface of the conductive sheet 6, the sheet is caused to make electrical contact with a number of addressed row conductors and addressed column conductors, the corresponding crossing points of which can be detected by the multiplexing circuit, which thus generates output signals indicative of substantially all the crossing points within the area of the surface of the conductive sheet which is in contact with the object thereupon.

However, for correct operation, it is necessary to use a relatively high resistance conductive sheet, as a low resistance sheet made of, for example, a metallised plastics material could cause the generation of incorrect output signals when pressure, caused by contact of the object, was applied over a large area of the surface.

In the preferred embodiment of the invention the alumina substrate is approximately 2.5 to 5 cms square and there are, in fact, 32 row conductors and 32 column conductors, although these are not shown in FIG. 1, and in FIG. 2 there would therefore be 32 connections at 15 and 16, respectively, as well as 32 operational amplifiers at 19.

The conductive sheet 6 preferably has a resistance of approximately 1MΩ per 2 cm square.

A practical problem may therefore arise in the construction of such a tactile array sensor of this size in that, whilst the row and column conductors are required at a relatively fine pitch of approximately 1 mm, insulation needs to be retained at the crossing points.

An economical solution to this problem can be obtained by using screen-printing methods to print the required conductor arrays onto the alumina substrate. The conductors and the insulation can be printed as separate layers in sequential stages onto the substrate, using a paste of powdered metal, such as gold, in powdered glass for the conductors and a paste of powdered glass for the insulation. Firstly, the row conductors are printed; then the glass insulation is printed on areas of the substrate where column conductors are required, and finally the column conductors are printed over these areas. The substrate can then be baked to fuse the printed layers therewith and the conductive rubber sheet can then be positioned thereabove.

This method can also be employed to assemble the electronic components of the circuit arrangement onto the under surface of the alumina substrate by using chip components, screen-printed conductor patterns and ball-welded interconnections, which are conventionally used in thick-film integrated circuits.

An insulative plastics or rubber sheet 9 is also preferably provided over the conductive rubber sheet 6 to prevent possible malfunction of the sensor when a metallic object is pressed thereon. Both the conductive rubber sheet and the insulative sheet can be made with a wide variety of mechanical characteristics, as well as being physically tough.

I claim:

1. A tactile array sensor comprising:
   a substrate,
   a first array of electrical conductors disposed on the substrate,
   a second array of electrical conductors overlying, and in crossing relationship with, the conductors of said first array,
   an electrically insulative material disposed between the first array and the second array to create an insulative barrier at least at crossing points where a conductor of the second array crosses a conductor of the first array,
   a sheet of an electrically conductive material overlying and engaging portions of said second array,
   and means for maintaining said electrically conductive sheet and said first array in spaced apart relationship unless pressure is applied to the sheet.

2. A tactile array sensor as claimed in claim 1 and including a circuit arrangement for detecting substantially all crossing points within an area of the surface of said conductive sheet to which pressure is applied and for generating electrical signals indicative of the locations of said crossing points within said area relative to the first and second arrays.

3. A tactile array sensor as claimed in claim 1 wherein the conductors of the first array and the conductors of the second array are respectively substantially parallel.

4. A tactile array sensor as claimed in claim 3 wherein the respective conductors of said first and second arrays are orthogonal with respect to each other.

5. A tactile array sensor as claimed in claim 1 wherein said conductive sheet is made of an electrically conductive rubber material.

6. A tactile array sensor as claimed in claim 1 and including an electrically insulative layer overlying said conductive layer.

7. A tactile array sensor as claimed in claim 6 wherein said insulative layer is made of an electrically insulative rubber or a plastics material.

8. A tactile array sensor as claimed in claim 1 wherein electronic components associated therewith are assembled on the opposing side of said substrate to that bearing said arrays.

9. A tactile array sensor as claimed in claim 1 wherein said substrate is fabricated from an alumina sheet.

10. A method of constructing a tactile array sensor comprising the steps of:
 (a) forming a first array of electrical conductors on a substrate,
 (b) depositing on said conductors, at selected locations, an electrically insulative material,
 (c) forming a second array of electrical conductors in crossing relationship with said first array such that said electrically insulative material presents an insulative barrier at least at crossing points where a conductor of the said second array crosses a conductor of the first array,
 (d) baking the substrate and
 (e) positioning an electrically conductive sheet on the substrate, so baked, such that said electrically conductive sheet engages portions of said second array.

* * * * *